(12) United States Patent
John et al.

(10) Patent No.: US 9,329,912 B2
(45) Date of Patent: May 3, 2016

(54) CORE-AFFINE PROCESSING ON SYMMETRIC MULTIPROCESSING SYSTEMS

(75) Inventors: Rekesh John, Livermore, CA (US); Srinivasa R. Addepalli, San Jose, CA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 917 days.

(21) Appl. No.: 13/549,342

(22) Filed: Jul. 13, 2012

(65) Prior Publication Data
US 2014/0019982 A1 Jan. 16, 2014

(51) Int. Cl.
*G06F 9/54* (2006.01)

(52) U.S. Cl.
CPC .. *G06F 9/544* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 6,424,992 B2* | 7/2002 | Devarakonda et al. | ....... | 709/203 |
| 7,590,736 B2* | 9/2009 | Hydrie et al. | ............... | 709/226 |
| 7,606,929 B2* | 10/2009 | Gbadegesin et al. | ......... | 709/235 |
| 7,613,822 B2* | 11/2009 | Joy et al. | ....................... | 709/235 |
| 7,693,050 B2* | 4/2010 | Achlioptas et al. | ............ | 370/229 |
| 7,889,734 B1* | 2/2011 | Hendel et al. | ................ | 370/392 |
| 8,260,996 B2* | 9/2012 | Wolfe | ............................ | 710/269 |
| 8,327,363 B2* | 12/2012 | Gopalan et al. | ............... | 718/102 |
| 8,856,794 B2* | 10/2014 | Kruglick | ....................... | 718/102 |
| 8,861,434 B2* | 10/2014 | Khawer et al. | ................ | 370/328 |
| 2004/0165590 A1* | 8/2004 | Reiner et al. | .................. | 370/392 |
| 2010/0064286 A1 | 3/2010 | Pinter et al. | | |
| 2013/0342989 A1* | 12/2013 | Singleton | ................ | 361/679.39 |

* cited by examiner

*Primary Examiner* — Hassan Kizou
*Assistant Examiner* — Hashim Bhatti
(74) *Attorney, Agent, or Firm* — Sherry W. Schumm

(57) ABSTRACT

Embodiments of a symmetric multi-processing (SMP) system can provide full affinity of a connection to a core processor when desired, even when ingress packet distribution, protocol processing layer and applications may autonomously process packets on different cores of the SMP system. In an illustrative embodiment, the SMP system can include a server application that is configured to create a plurality of tasks and bind the plurality of tasks to a plurality of core processors. One or more of the plurality of tasks are configured to create a corresponding listening endpoint socket, bind and listen on a protocol address that is common to the plurality of tasks.

18 Claims, 10 Drawing Sheets

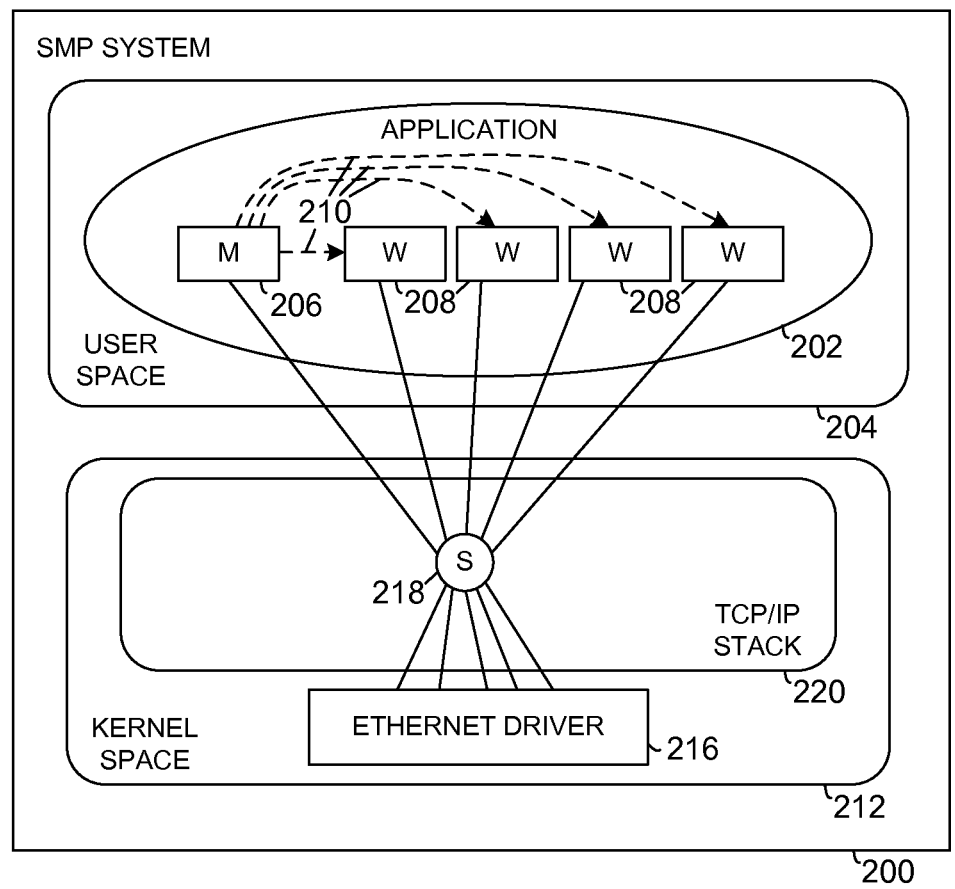
PRIOR ART
FIG. 2.1

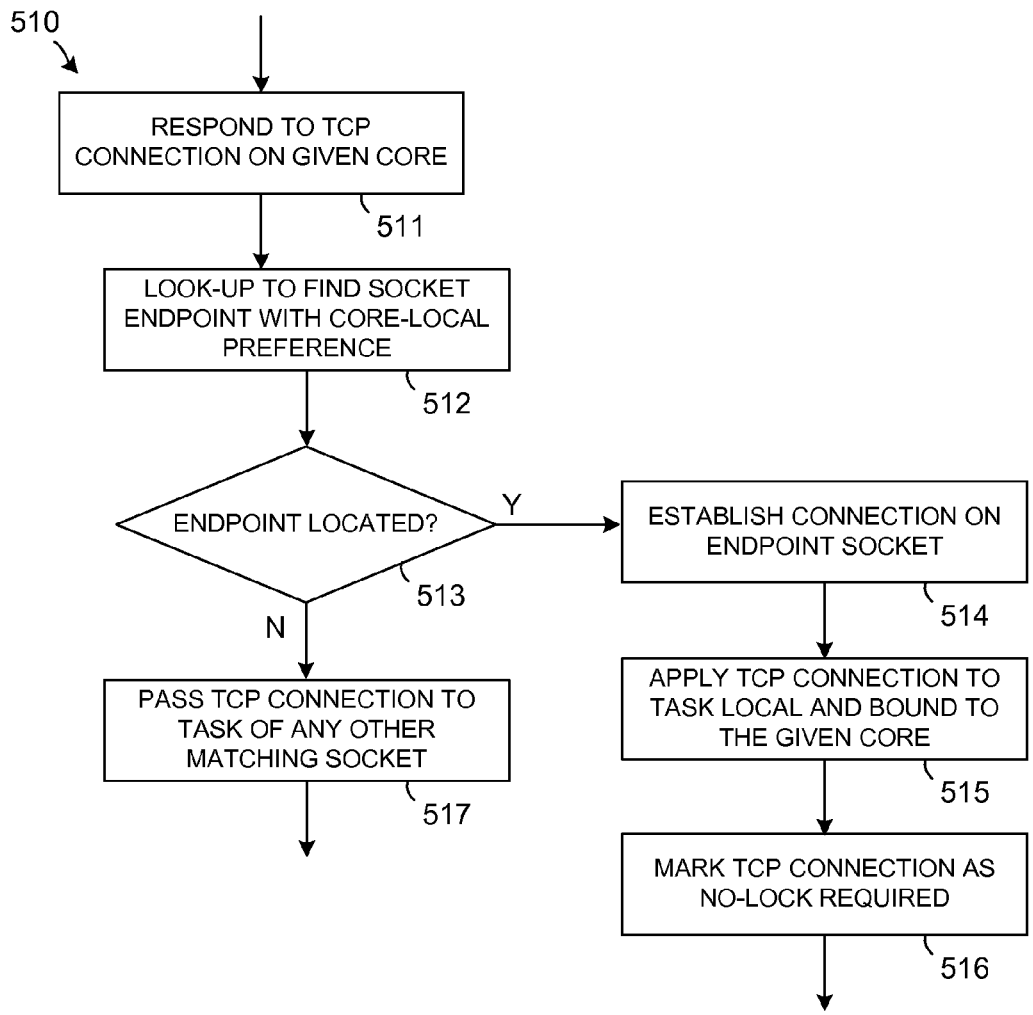
FIG. 5.1

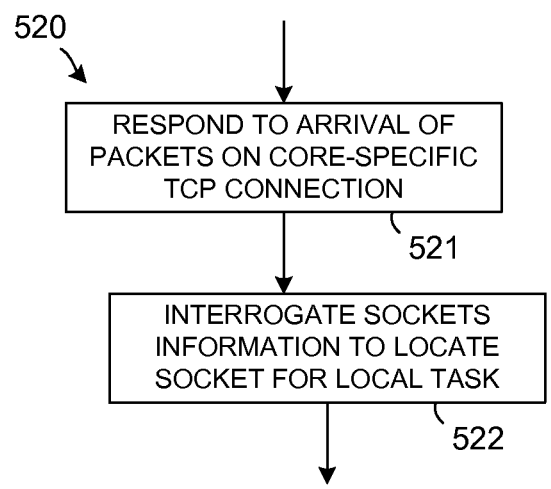
FIG. 5.2

CORE-AFFINE PROCESSING ON SYMMETRIC MULTIPROCESSING SYSTEMS

BACKGROUND

Various scheduling algorithm implementations differ in adherence to processor affinity. Under some circumstances, an implementation can allow a task to change execution to a different processor if deemed to be most efficient. An example situation can involve two processor-intensive tasks, task A and task B, which have affinity to one processor while another processor is idle. Some scheduling algorithms shift task B to the second processor to maximize processor use. Task B accordingly acquires affinity with the second processor while task A continues to have affinity with the first processor.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
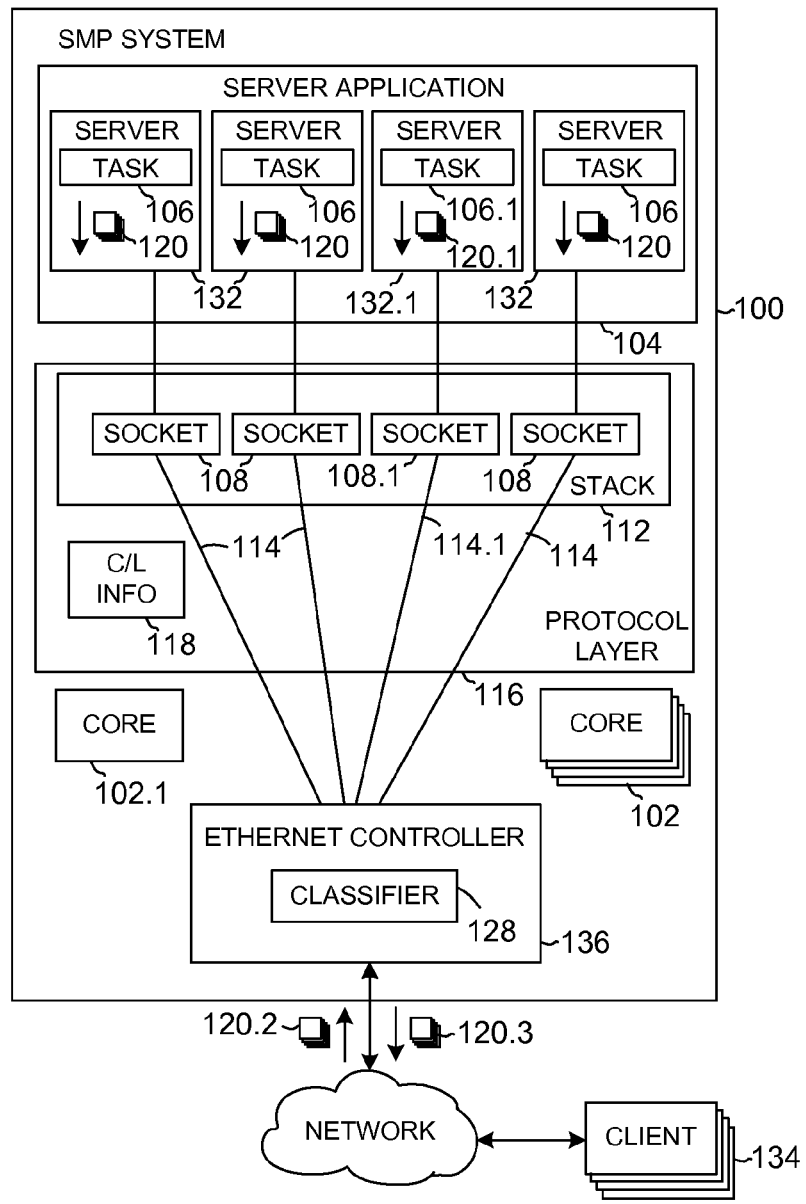
FIG. 1 is a schematic block diagram depicting an embodiment of a SMP system that provides full affinity of a TCP connection to a core processor.

Transmission Control Protocol (TCP) processing on Symmetric Multiple Processing (SMP) systems exhibits a performance constraint, a failure to provide full affinity of a TCP connection to a core when desired, even when ingress packet distribution is configured to create core affinities. A packet arriving on one core may be processed by an application running on another core, essentially destroying affinity. The behavior arises from the semantics of symmetric processing, which retains functionality independent of the number of cores, or on which cores an application runs. An end result of the behavior can be non-optimal performance since sharing resources between cores can result in the use of locks and non-optimal use of caches.

Approaches for binding traffic flows to specific cores of a multi-core system can enable performance improvement. Specific methods to accomplish such affinity vary, depending on the nature of the hardware, the type of software environment, the type of traffic being bound, and application behavior.

For example, a stream scheduler running on one core, can accept all flows and farm out flows to packet schedulers running on each of the other cores. The stream scheduler can function as a packet distribution unit that creates flow affinities to cores. Then, the packets can be processed by the packet scheduler on the cores. The stream scheduler does not address operations after flows are accepted by a core.

The illustrative systems and techniques disclosed herein address, once flows are assigned to a core, how to continue processing on the same core, by bringing together the protocol processing and application entities which exist independent of one another on to the same core. Conventional systems only perform assignment and do not address how to continue processing on the same core. Disclosed system and technique embodiments provide TCP flow affinity between independent entities which is further addressed in the protocol layer and in the application layer.

Core affinity or processor affinity, which can be called processor pinning, is a modification of a central queue scheduling algorithm in a symmetric multiprocessing operating system. A task is a unit of program execution such as a process or thread. Each task, such as a process or thread, in the queue is tagged to indicate a preferred or associated processor. At allocation time, the tasks are allocated to a corresponding preferred processor in preference to other processors. Core-affine processing includes various processing techniques that enable or facilitate core affinity.

Core affinity exploits the condition that some remnants of a process remain in a processor's state (specifically the cache) from the most recent execution of the process. Scheduling the process with associated remnants in the processor's state in the same processor in a subsequent execution enables the process to run more efficiently by reducing performance degradation circumstances such as cache misses.

Embodiments of electronic circuits, systems, executable logic, and associated operating methods disclosed herein enable improvement of TCP processing throughput in many use cases by providing full core affinity of connections throughout the entire processing. Conventional techniques do not enable full affinity throughout the entire processing for SMP operating systems and applications, such as Linux. Improved throughput can be achieved without violating symmetric processing semantics that commonly occur from existing applications that use the protocol stack.

Various embodiments of electronic circuits, systems, executable logic, and associated operating methods disclosed herein enable the capability for applications to suggest core-affine processing for a TCP connection on an SMP system. For connections marked for core-affine processing, the protocol processing layer attempts to perform all processing of a particular connection on one core when possible, and falls back to core-agnostic behavior when not possible. Various specific techniques can be used to attain the core-affine processing and enable applications to suggest core-affine processing for a TCP connection on an SMP system.

The fall-back to normal processing ensures that new or legacy SMP applications that do not use the disclosed techniques for core-affine processing are not affected. For applications that do use core-affine processing, performance benefits are attained by avoiding synchronization and sharing data across cores for a connection. Legacy applications do not benefit from performance improvement, but legacy applications that can specifically indicate core-affine processing benefit by avoiding synchronization and sharing data across cores.

Incoming TCP connections can be distributed to various processing nodes in a distributed system or to cores in a multiple core system. Distribution methods can be used in network load balancers which distribute to multiple nodes and Ethernet controllers which distribute to multiple cores. The techniques can use classifiers and sometimes intelligent state information to provide affinity of connections to nodes so that the same node or core may process a given connection.

In a multiple-core SMP system, an Ethernet controller or an ingress packet distribution unit can distribute incoming TCP packets to various cores of the system, and provide some connection affinity. However, conventional connection affinity does not guarantee that the protocol processing layer running on the cores would continue all the processing of packets for a given connection on that core. The packet may be meant for an application that is currently running on another core. Processing in such case involves passing the packet to the application on another core, which in turn implies cross-core communications, sharing of resources, less efficient use of CPU caches, and use of locks or other synchronization primitives. Such operations can lower performance of the connection in terms of establishment time and throughput.

SMP specifications call for the capability to enable a server application running on any core to be able to process an incoming connection arriving on any of the cores. Increasing or decreasing the number of cores, or moving applications from core to core, should not affect the functionality of an application in an SMP system.

Complete processing of a TCP connection can involve three entities that function autonomously including an ingress packet distribution unit, an application, and a TCP protocol layer. The ingress packet distribution unit can be configured to send packets to cores with core affinity for connections, if desired, but generally does not have the intelligence to determine or operate on the basis of whether an application exists that can receive the sent packets, and if such an application does exist, whether the application is running on the same core to which the packets of a connection are sent.

The application that receives the packet may be bound to a specific core, or may allow a scheduler to move the application from core to core. The application generally does not have intelligence capability to determine or operate upon which core an expected packet will actually arrive.

The TCP protocol layer that processes and delivers the packet to the application does not a priori have information about which core packets of a given connection will arrive, and on which core a consumer application of that packet will be running when the packet is delivered. The application, protocol layer, and ingress packet distribution unit are autonomous entities that have to coordinate to ensure that a TCP connection is processed completely on a given core.

Embodiments of electronic circuits, systems, executable logic, and associated operating methods disclosed herein attain performance benefits by enabling an application that runs on one or more cores to accept and process TCP connections locally on each core at which packets arrive, given that packets for any given connection always arrive at the same core. Performance benefits arise from avoiding cross-core sharing and resulting degradations.

Embodiments disclosed herein include a technique for avoiding cross-core communications, data sharing, and synchronization, enabling a given TCP connection to be processed fully locally on one core while preserving symmetric processing requirements.

Referring to FIG. 1, a schematic block diagram depicts an embodiment of a SMP system 100 that provides full affinity of a TCP connection to a core processor 102 when desired, when ingress packet distribution is configured to create core affinities. In the illustrative embodiment, the SMP system 100 can include a server application 104 that is configured to create a plurality of tasks 106 and bind the plurality of tasks 106 to a plurality of core processors 102. Each individual task 106 of the application is affine to one core processor 102. One or more of plurality of tasks 106 is configured to create a corresponding listening endpoint socket 108, bind and listen on the same TCP endpoint address and an associated protocol address and port address, that is common to the plurality of tasks 106. Each applicable task 106, whether a thread or process, is bound to one processor core 102 on a one-to-one basis and creates one corresponding listening socket. All tasks 106 do bind and listen to the same TCP protocol endpoint address.

A socket, for example a network socket, is an endpoint of an inter-process communication flow across a network. Commonly, communication among computers or other devices with computing and communication capability is based on the Internet Protocol (IP) so that most network sockets are IP sockets. A socket connection can be characterized by a unique combination of a local socket address (a local IP address and port number), a remote socket address (for established TCP sockets), and a protocol (transport protocol such as TCP, User Datagram Protocol (UDP), raw IP, and the like). The operating system and application which creates the socket identify the socket by a unique identifying number called a socket identifier or socket number. The operating system forwards the payload of incoming IP packets to the corresponding application by extracting the socket address information from the IP and transport protocol headers and stripping the headers from the application data.

In some embodiments and/or applications of the SMP system 100, the plurality of tasks 106, which are affine or connected to processor cores 102, are configured to generate an indication to a stack 112 such as a Transmission Control Protocol/Internet Protocol (TCP/IP) stack 112 on the plurality of endpoint sockets 108 respective to the plurality of tasks 106. The indication specifies that a listened-to endpoint socket 114 preferably accepts endpoint connections arriving on the same core processor 102 as that of the corresponding task 106.

TCP/IP stacks 112 are widely used on SMP systems. The illustrative method for core-affine TCP processing on SMP systems 100 facilitates better throughput for benchmarks and applications.

In further embodiments and/or applications of the SMP system 100, the server application 104 can be configured such that the indication is recorded by the TCP/IP stack 112, for example, by marking an endpoint socket 108 respective to a task of the plurality of tasks 106 to indicate a local core preference. The TCP/IP stack 112 stores core-identifier information within the endpoint socket 108 and/or stores the endpoint socket 108 in a core-local data structure that is specific to the respective core processor 102.

Particular embodiments of the SMP system 100 can further include a protocol layer 116 which is configured to respond to an ingress TCP connection 114 on a predetermined core processor 102.1 of the plurality of core processors 102 by performing a look-up of core-local information 118 to locate a listening endpoint socket 108.1 that corresponds to a task 106 which is local to the predetermined core processor 102.1 with a core-preference for handling the TCP connection 114 using the listening endpoint socket 108.1. The TCP connection 114, if located, is established on the located listening endpoint socket 108.1, applied to the task local and bound to the predetermined core processor 102.1 without sharing data structures between cores or using locks, and is marked as no-lock required. In contrast, the TCP connection 114, if a local listening task is not located, is passed to any available task of a matching socket with semantics preserved.

The TCP connection 114, when located, applies subsequent packets 120 of that TCP connection 114 arriving on the located TCP connection 114 on the predetermined core processor 102.1 to the task local and bound to the predetermined core processor 102.1 and processed lock-free.

Further particular embodiments of the SMP system 100 can also include a protocol layer 116 which is configured to respond to arrival of a plurality of packets 120 of an incoming TCP connection 114 on a predetermined core processor 102.1 of the plurality of core processors 102 by interrogating sockets information to locate an endpoint socket 108 corresponding to a task local to the predetermined core processor 102.1 with a core preference for handling the TCP connection 114 using the listening endpoint socket 108.

Embodiments of the illustrative SMP system 100 can further include a TCP/IP stack 112 that is configured to interrogate sockets information to find a matching socket with an indicated local core preference and establish a connection on the predetermined core processor 102.1 and pass the established connection 114.1 to an application task that executes on the predetermined core processor 102.1. The established connection 114.1 is marked as lockless.

Various embodiments of the SMP system 100 can be formed such that the protocol layer 116 is configured wherein connection establishment and passing of the established connection 114.1 to a locally-bound server process 132.1 are attained without sharing data structures across core processors 102 and without cross-core data sharing and locks.

Further example embodiments of the SMP system 100 can be formed such that the protocol layer 116 is configured in absence of a task local to the predetermined core processor 102.1 with an indicated core preference to select any other task, either thread or process, that is waiting for the TCP connection 114 by locating a matching endpoint socket 108 on another core processor 102 or an endpoint socket 108 that does not have the core-preference indicated on the endpoint socket.

Other embodiments and/or applications of the SMP system 100 can further include a classifier 128 configured to send initial and subsequent incoming packets 120.1 for the TCP/IP connection 114 to the predetermined core processor 102.1 wherein a task 106 on the predetermined core processor 102.1 holds the TCP/IP connection 114 and the subsequent packets 120.1 are processed on the predetermined core processor 102.1 without cross-core communications and sharing of data. Sending the initial and subsequent incoming packets 120.1 for the TCP/IP connection 114 to the predetermined core processor 102.1 helps to establish the connection in a lockless manner. The method applies to all packets of the connection both initial and subsequent. The classifier 128 gives connection affinity on ingress packets to core processors 102. The TCP/IP connection 114 is identified for lockless processing by a protocol stack 112 by marking of a lockless attribute.

Some embodiments of the SMP system 100 can further include a protocol layer 116 which is configured to process egress packets 120.2 passing from a server 132 to a client 134 and ingress packets 120.3 passing from the client 134 to the server 132 without cross-core data sharing and locks wherein egress packets 120.2 originating from the server 132 are bound to a predetermined core processor 102.1 of the plurality of core processors 102 at which ingress packets 120.3 of a TCP connection 114 also arrive. The ingress packets 120.3 and the egress packets 120.2 are processed on the same predetermined core processor 102.1. Server functionality can be implemented by a process or thread.

In particular embodiments of the SMP system 100, the protocol layer 116 can use a lockless attribute marked on the TCP connection 114 to specify that locks are not required when processing the TCP connection 114.

In operation, a multi-tasked or multi-threaded server application 104 accepts connections 114 on all the cores 102 of the SMP system 100, with each task 106 bound to a core 102. The tasks 106 can be either separate threads or processes. Each task 106 creates a listening endpoint socket 108 and listens to the same protocol address as all the other tasks 106. The task 106 also indicates to the protocol layer 116 a preference to accept, on that socket 108, connections that are local to the core, such as packets 120 that arrive on the core 102. The protocol layer 116 is enhanced to support this concurrent listening and preference indications on sockets 108.

An ingress packet handling unit, for example an Ethernet controller 136, can be programmed to distribute incoming packets 120 to individual cores 102, such as using a 5-tuple hash distribution, essentially supplying flow affinity. This ensures that a flow always lands on the same core 102. An Ethernet controller is one example of an ingress packet processing unit. Other ingress packet processing units can also be used.

The protocol processing layer 116, on receiving ingress TCP connection packets 120 on a core 102, looks up core-local socket data structures in the protocol layer 116 to determine whether a local task's socket is marked as interested in processing the connection 114. If so the connection 114, which is established on the local core 102, is given to the socket's task that is also bound to the local core 102. The connection 114 is marked as lockless. If no matching socket is found, the protocol processing layer 116 passes the connection to any available matching socket's task in essentially a fall back behavior, ensuring that applications that are not aware of the proposed core-local socket processing feature are not affected.

Once the connection is assigned to a local task, all further ingress packets on the flow arrive on the same core 102 and are also sent to the same socket 108 and task 106 on the core 102.

Figure 2:
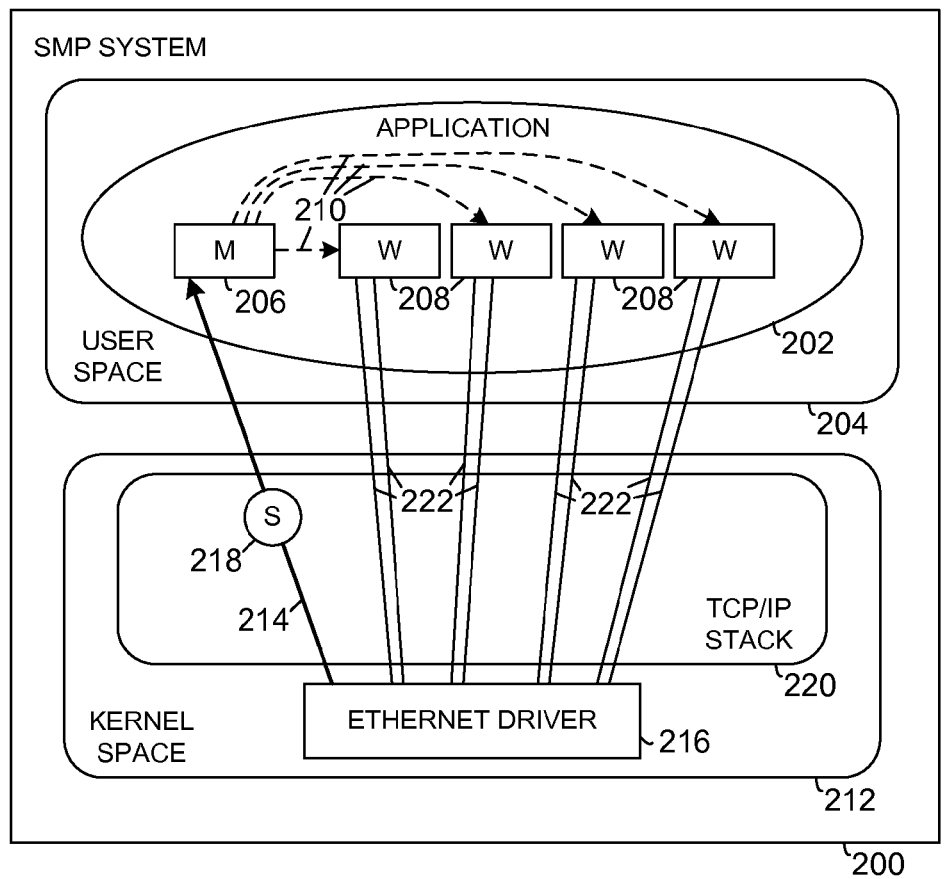
FIG. 2, including FIG. 2.1, labeled PRIOR ART, is a schematic block diagram illustrating a technique for TCP server connection handling in an SMP system via master/worker interactions.

Referring to FIG. 2, labeled PRIOR ART, a schematic block diagram illustrates a technique for TCP server connection handling in an SMP system 200 via master/worker interactions. An application 202 operating in a user space 204 executes a master task 206 and one or more worker tasks 208 with connection assignments 210 made by the master task 206 to the worker tasks 208. In a kernel space 212, a new TCP connection 214 is made between an Ethernet driver 216 and the master task 206 through a network socket 218 in a TCP/IP stack 220. The connection assignments 210 establish assigned TCP connections 222 through the TCP/IP stack 220.

The Internet protocol suite (TCP/IP) is the set of communication protocols used for the Internet and similar networks and is a common protocol stack for wide area networks. TCP/IP specifies end-to-end connectivity including data formatting, addressing, transmission, routing, and receipt at a destination. TCP/IP has four abstraction layers, each with defined protocols, including: (1) a link layer (Ethernet) containing communication technologies for a local network, (2) an internet layer (IP) connecting local networks and thus establishing internetworking, (3) a transport layer (TCP) handling host-to-host communication, and (4) an application layer such as Hypertext Transport Protocol (HTTP) which contains protocols for specific data communications services on a process-to-process level (for example, web browser communications with a web server).

Servers are typically processes that supply application services and create sockets that are in a listening state. The sockets wait for initiatives from a client program. A TCP server may serve multiple clients concurrently by creating a child process for each client and establishing a TCP connection between the child process and the client. Unique dedicated sockets are created for each connection, forming an established connection as a socket-to-socket virtual connection or virtual circuit (for example a TCP session) with a remote socket for communicating a bidirectional or duplex data stream.

The master task 206 performs several operations including listening and accepting connections from clients. The master task 206 uses the network socket 218 or equivalent construct, and farms out established connections 222 to worker tasks 208, either threads or processes.

The worker tasks 208 perform application processing on a connection. The worker tasks 208 may be part of a worker pool, or can be created on demand. The worker tasks 208 are assigned connections 210 by the master task 206. The worker tasks 208 may be bound to specific cores, or free to run on any core.

Using the master/worker scheme for TCP server connection handling, connections are established wherein packets may arrive on any core and processed on the one core where the master currently runs. The master then assigns the connection to one of the workers using some scheduling algorithm. Subsequent packets of the connection are processed by the worker. Since workers may run on any core at any time, and the master does not know on which core that packets for a connection might arrive, data sharing, cache contention and locking can be required since packets need to be moved from the arriving core to the core where the worker currently runs.

In another example master/worker concurrent process model, shown in FIG. 2.1 labeled PRIOR ART, a master process 206 can create a socket 218 and spawn N processes, shown as worker tasks 208. All processes 208 share the same socket. All processes 208 accept connections on the shared socket 218, for example by creating a queue on the shared socket 218 for waiting processes. The TCP/IP stack 220 assigns a new connection to the first waiting process in the queue, resulting in round-robin assignment. A process completes and returns to a waiting state while awaiting a new connection. For example, the completed process can enter at the tail of the queue.

The master/worker concurrent process model has several drawbacks. Sharing of sockets and queues across cores leads to a requirement for cross-core data access, synchronization and locks. Round-robin scheduling from the queue eliminates local-core affinity.

The master/worker concurrent process model is directed toward assignment of connections or flows to resources such as the processor (central processing unit) and memory, and monitoring of resulting performance or load. The model rebalances the connections or flows based on the monitoring. The model does not address how an assignment of connections or flows, once selected, can actually be made core-affine within the protocol processing, scheduler, and application layers on a symmetric multiprocessing (SMP) system.

In contrast to the master/worker concurrent process model, embodiments of a system and associated operating method enable the capability for applications to perform core-affine processing for a TCP connection on an SMP system by creating and executing multiple server tasks, such as processes or threads. To enable any core to accept connections, multiple tasks of a server application are bound to the cores, one per core. All tasks create a socket each, and bind and listen on the same TCP/IP endpoint address to accept connections. A special indication is provided by these tasks to the TCP/IP stack on respective sockets, stating that the connection endpoint that is subject to listening should preferably accept connections arriving on the same core.

The special indication is recorded by the TCP/IP stack by marking the respective socket as having the property of local core preference. The stack may store the core-identifier information of the process within the socket and/or store the socket in a core-local data structure that is specific to the particular associated core.

Figure 3:
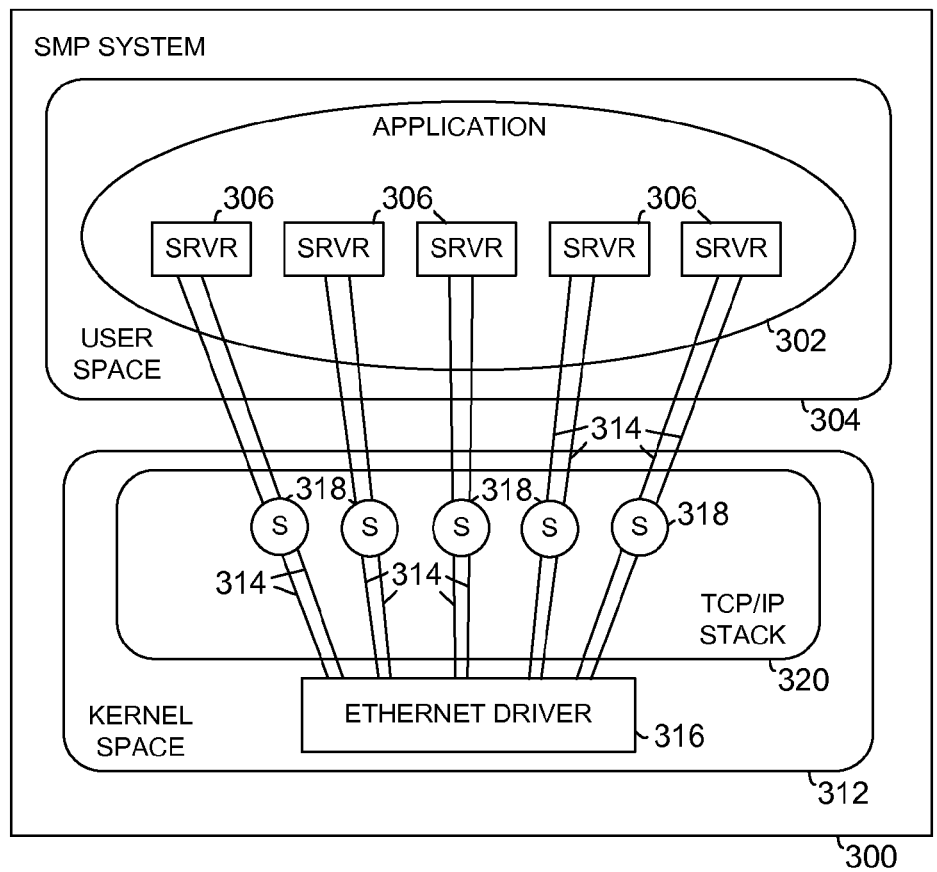
FIG. 3 is a schematic block diagram that depicts an embodiment of a system and associated operating method which enables the capability for applications to suggest core-affine processing for a TCP connection on an SMP system.

Accordingly, referring to FIG. 3, a schematic block diagram depicts an embodiment of a system and associated operating method which enables the capability for applications to perform core-affine processing for a TCP connection on an SMP system. The disclosed method implements TCP connection affinity to cores throughout the complete protocol processing on an SMP system, and also can make the processing lockless. The method does not affect the functionality of legacy (existing) applications. The illustrative system and method describe a particular method of how an assignment can be actually implemented in an SMP system. The illustrative system 300 enables concurrent listening servers 306. An application 302 operating in a user space 304 runs one or more servers 306. In a kernel space 312, established assigned TCP connections 314 are made between an Ethernet driver 316 and the servers 306 through network sockets 318 in a TCP/IP stack 320.

The concurrent listening servers 306 operate wherein each thread (server 306) listens on the same TCP endpoint address using separate sockets 318. Servers 306 are bound to processor cores. The servers 306 indicate core-local connection scheduling preference for corresponding sockets 318.

Embodiments of the system and associated operating method can further use an ingress packet classifier. Ingress TCP packets arriving on the multiple-core processor are sent to different cores by a control unit or device, based on the ingress packet classifier. An Ethernet controller or driver can be used to configure the ingress packet classifier. An Ethernet controller is an ingress packet processing unit that is separate from the core processor and is the first entity to receive packets from the network. An Ethernet driver can execute on the cores processors and operate as part of the protocol processing layer. The classifier may use a distribution element, such as a hash distribution on a 5-tuple or other distribution techniques. As a result, affinity is created for a given TCP connection to one of the cores, and supply core distribution. The classifier can distribute packets to cores based on some method such as a 5-tuple hash, thus creating flow affinities to cores.

Thus, in connection processing, a classifier in the Ethernet driver 316 (or an Ethernet controller) provides connection affinity to cores. The Ethernet driver 316 shown in kernel space can correspond to an Ethernet controller. The stack 320 establishes the TCP connection via SYN, SYN-ACK, and ACK signals on the same core without cross-core data sharing and locks or without sharing data structures with other cores, since all packets for that connection will arrive on the same core by virtue of the classifier and the presence of a local listener is guaranteed. The stack 320 passes the connection on to the local listening server 306 after marking the connection as lock-free. Subsequent packets of the connection also arrive at the associated core and are sent to the same listening server, lock-free. Outgoing packets are also processed lock-free.

Embodiments of the system and associated operating method can further address subsequent packets on a connection. All subsequent incoming packets for a connection are sent to the same core by the classifier. With the connection also being held by a task on the same core, the subsequent incoming packets can be also processed on the same core without requiring cross-core communications or sharing. The connections are identified for lockless processing by the protocol stack by virtue of having a lockless attribute marked on the connections.

An element such as a TCP/IP stack can perform connection establishment. When packets of an incoming TCP connection arrives on a core, the TCP/IP stack can establish the connection on that core using a SYN, SYN-ACK, ACK three-way hand shake, and passes the connection to an application task that is waiting on the same core. The connection can be established by interrogating sockets information to find a matching socket that has the indicated local core preference. The connection thus passed is also marked as lockless.

The TCP connection is established using a three-way handshake. Before a client attempts to connect with a server, the server first binds to a port for opening to connections in a listen operation. Once the listen is established, a client may initiate a connection. To establish a connection, the three-way or step handshake occurs including a SYN signal sent from the client to the server that sets a segment sequent number, a SYN-ACK signal with which the server replies to the client with an acknowledgement number and the sequence number set by the server for the packet, and an ACK signal by which the client sends acknowledgement to the server.

In contrast to conventional TCP connection, system and technique embodiments disclosed herein enable a connection establishment procedure that facilitates assurance that connection establishment processing can be performed without sharing data structures across cores and thus without cross-core data sharing and locks.

If a locally waiting task is not found, then the operation falls back to choosing any task that is waiting for the connection, by finding a matching socket on another core, or a socket that does not have the indicated core-local preference.

Embodiments of the system and associated operating method can further handle egress packets. Packets originating from the server and passing out to the client are also processed without cross-core data sharing and locks, a condition which is enabled because the packets originate from the server which runs bound to the same core where ingress packets also arrive. Thus both ingress and egress packets can be always processed on the same core. The lockless attribute marked on the connection informs the protocol processing layer that locks are not required when processing the connection.

Embodiments of the system and associated operating method can also preserve symmetric processing semantics. The indication on a socket for core-local processing is discretionary (not mandatory), and if no matching socket with the core-local attribute is found on a core for an incoming connection, the protocol processing layer falls back to the behavior of finding any socket on the system that matches the incoming connection. Thus legacy (existing) applications that do not make use of the feature are not affected and may be scheduled on any core when accepting and processing TCP connections. Configuring the ingress packet distribution unit to generate connection affinity to cores also does not prevent legacy applications from accepting and processing the connections from any core.

Accordingly, the system and technique enabling concurrent listening servers 306 preserves existing semantics. If no local listener is found, the stack 320 locates a listening server 306 on another core, or locates a generic listener, defined as a listener that is not marked with core-local preference. For a generic listener, round-robin selection or other suitable scheduling can be used. The connection is assigned to the selected server 306.

Figure 4:
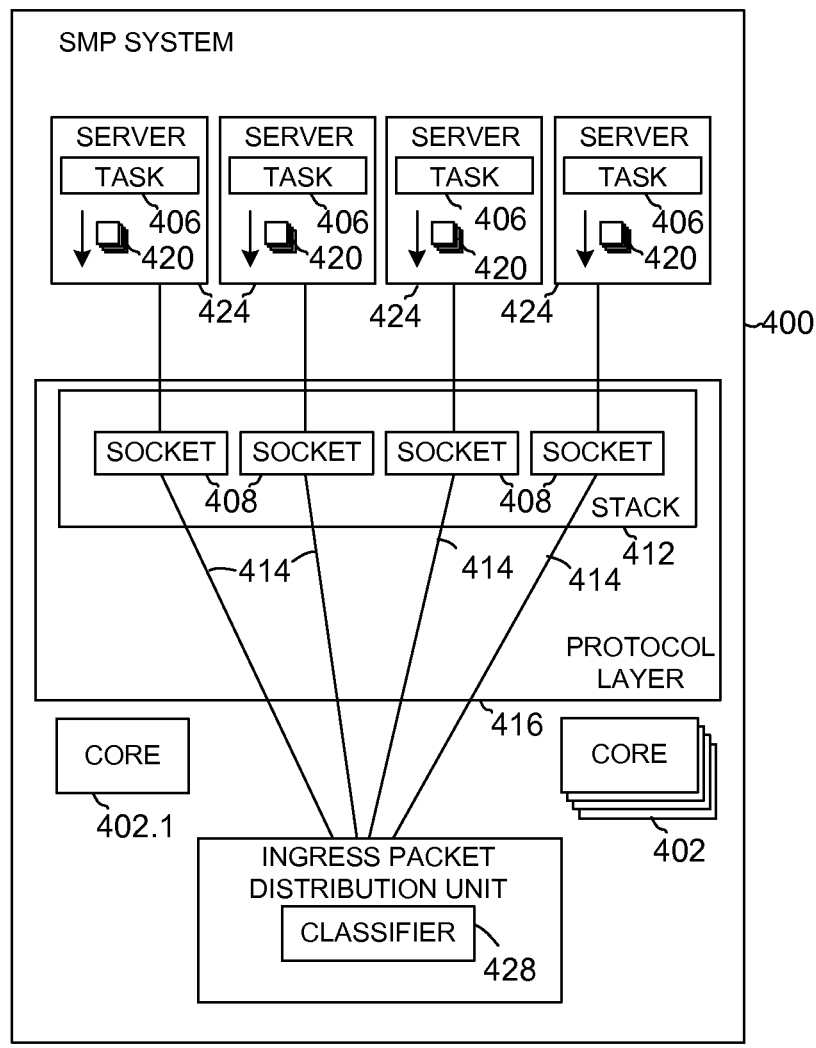
FIG. 4 is a schematic block diagram illustrating an embodiment of a SMP system that enables full affinity of a TCP connection to a core.

Referring to FIG. 4, a schematic block diagram illustrates an embodiment of a SMP system 400 that enables full affinity of a TCP connection 414 to a core 402. The illustrative SMP system 400 can include a protocol layer 416 configured to respond to arrival of a plurality of packets 420 of an incoming TCP connection 414 on a predetermined core processor 402.1 of a plurality of core processors 402 by interrogating sockets information to locate an endpoint socket 408 corresponding to a task 406 which is local to the predetermined core processor 402.1.

Some embodiments and/or applications or the SMP system 400 can further include a Transmission Control Protocol/Internet Protocol (TCP/IP) stack 412 which is configured to interrogate sockets information to find a matching socket with an indicated local core preference and establish a connection on the predetermined core processor 402.1 and pass the established connection to an application task 406 that executes on the predetermined core processor 402.1. The established connection 414 is marked as lockless.

In various embodiments of the SMP system 400, the protocol layer 416 can be configured such that connection establishment and passing of the established connection 414 to a locally-bound server process 424 are attained without sharing data structures across core processors 402 and without cross-core data sharing and locks.

In further embodiments and/or applications of the SMP system 400, the protocol layer 416 can be configured in absence of a task 406 which is local to the predetermined core processor 402.1 with an indicated core preference to select any other task 406 that is waiting for the TCP connection 414 by locating an endpoint socket 408 corresponding to a task 406 which is local to any other core processor 402 or an endpoint socket 408 that does not have the core-preference indicated on the endpoint socket.

Other embodiments and/or applications of the SMP system 400 can further include a classifier 428 configured to send initial and subsequent incoming packets 420 for the TCP/IP connection 414 to the predetermined core processor 402.1 wherein a task 406 on the predetermined core processor 402.1 holds the TCP/IP connection 414 and the subsequent packets 420 are processed on the predetermined core processor 402 without cross-core communications and sharing of data. The TCP/IP connection 414 is identified for lockless processing by a protocol stack 412 by marking of a lockless attribute.

Figure 5:
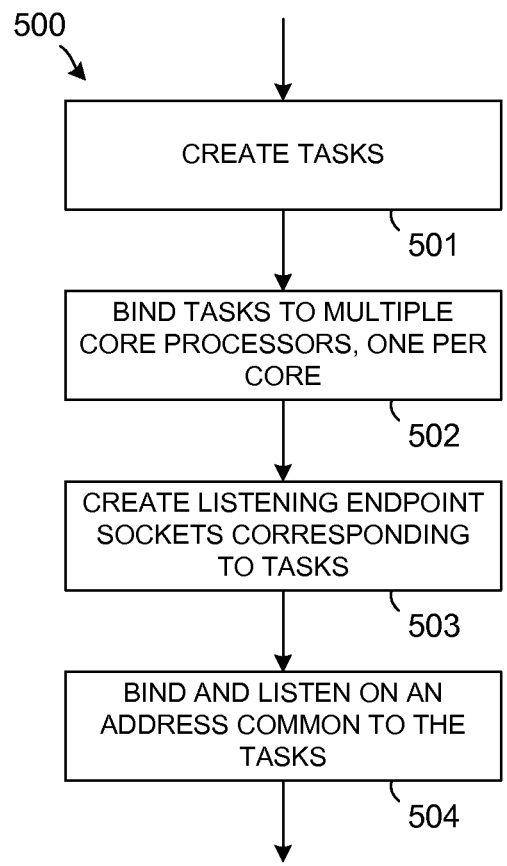
FIG. 5, including FIG. 5.1 and FIG. 5.2, shows schematic flow charts illustrating an embodiment or embodiments of a method for SMP using a technique that enables full affinity of a TCP connection to a core.

Referring to FIG. 5, including FIG. 5.1 and FIG. 5.2, schematic flow charts showing an embodiment or embodiments of a method 500 for SMP using a technique that enables full affinity of a TCP connection to a core. An illustrative embodiment of a method 500 for SMP can include creating 501 a plurality of tasks, and binding 502 the plurality of tasks to a plurality of core processors. A listening endpoint socket corresponding to the plurality of tasks can be created 503 on a one-to-one basis. The method 500 can further include binding and listening 504 on a protocol address common to the plurality of tasks.

Some embodiments of a method 510 for SMP can further include responding 511 to an ingress TCP connection on a predetermined core processor of the plurality of core processors. Responding 511 to an ingress TCP connection on the predetermined core processor can include performing 512 look-up of core-local information to locate a listening endpoint socket corresponding to a task local to the predetermined core processor with a core-preference for handling the TCP connection using the listening endpoint socket.

If the listening endpoint is located 513, the TCP connection on the located listening endpoint socket can be established 514, the TCP connection can be applied 515 to the task local and bound to the predetermined core processor, and the TCP connection can be marked 516 as no-lock required.

If the listening endpoint is not located 513, the TCP connection can be passed 517 to any available task of a matching socket with semantics preserved.

Various embodiments of a method 520 for SMP can further include responding 521 to arrival of a plurality of packets of an incoming TCP connection on a predetermined core processor of the plurality of core processors. Responding 521 to arrival of the plurality of packets of the incoming TCP connection on the predetermined core processor can include interrogating 522 sockets information to locate an endpoint socket corresponding to a task local to the predetermined core processor with an indicated core preference.

Figure 6:
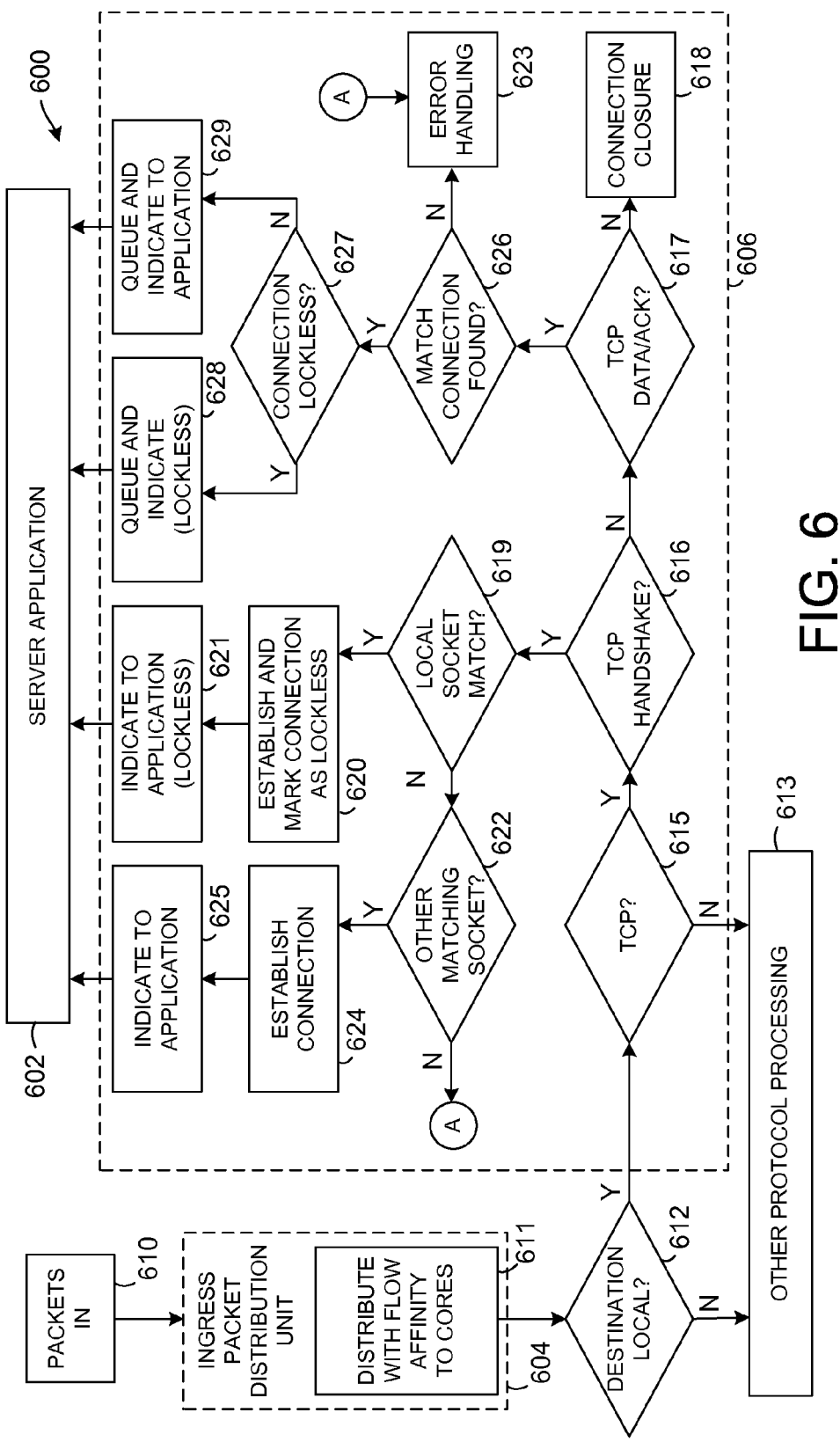
FIG. 6 is a schematic block and flow diagram showing an embodiment of an SMP system configured for an operation flow of TCP protocol processing.

Referring to FIG. 6, a schematic block and flow diagram shows an embodiment of an SMP system 600 configured for an operation flow of TCP protocol processing. The illustrative SMP system 600 includes a server application 602, an ingress packet distribution unit 604, and a protocol layer 606. The server application 602 creates multiple tasks and binds the created tasks to individual cores of the SMP system 600. The individual tasks create a listening endpoint or socket and listens to the same endpoint protocol address as all other tasks. A task also indicates to the protocol layer 606 a preference to accept connections that are local to the core, for example packets that arrive on the core.

The ingress packet distribution unit 604 which can be, for example, an Ethernet controller or driver, is configured to distribute incoming packets to individual cores, enabling TCP connection affinity to cores. Various techniques can be used to distribute the packets. For example, a hash technique such as a 5-tuple hash can be used to distribute the packets.

The protocol layer 606, upon receiving an ingress TCP connection on a core looks up core-local information to locate the socket of a local task that can suitably handle the connection. If found, the connection is established on that socket and given to the task bound to the core. The connection is marked as no-lock required. All further packets also arrive on the core and are given to the same task and processed lock-free. If no matching local task's socket is found, the connection is passed to any available matching socket's task, preserving existing SMP semantics.

Analysis of the operating flow of TCP protocol processing can be described beginning with the receipt of packets 610 at the ingress packet distribution unit 604 which distributes 611 the packets with flow affinity to the cores.

If the destination of the packets is not local 612, the operation flow proceeds to other protocol processing 613. If the destination is local 612, protocol processing 606 determines whether the packets are to be processed using TCP protocol processing 615. If not destined for TCP protocol processing 615, the operation flow proceeds to other protocol processing 613. If subject to TCP protocol processing 615, protocol processing 606 determines whether signals indicate a TCP handshake 616. If the signals do not indicate a TCP handshake 616, protocol processing 606 determines whether the signals indicate a TCP data acknowledge 617. If signals do not indicate a TCP data acknowledge 617, protocol processing 606 closes the connection 618.

If the signals indicate a TCP handshake 616, protocol processing 606 determines whether a match occurs 619 for a local core-affine socket. If a local core-affine socket match occurs 619, protocol processing 606 establishes the connection without cross-core data sharing or locks and marks the connection as lockless 620. Protocol processing 606 then indicates 621 to the application on the same core (again without cross-core data sharing) that the lockless connection is available. The server application 602 picks up the connection without using locks and continues its processing. The protocol processing layer and the application are autonomous entities. The protocol layer establishes the connection and then indicates the connection to the application. The application then picks up the connection. Since operations are performed on the same core, no cross-core sharing and locking are required. If no local core-affine socket match occurs 619, protocol processing 606 determines whether any other matching socket is present 622. If no other matching socket is present 622, protocol processing 606 proceeds to error handling 623. If other matching socket is present 622, protocol processing 606 establishes 624 a connection, then indicates 625 to the application that the connection is established. The application 602 picks up the connection and proceeds with processing.

If signals indicate a TCP data or acknowledgement 617, protocol processing 606 determines whether a matching connection is found 626. If a matching connection is not found 626, protocol processing 606 proceeds to error handling 623. If a matching connection is not found 626, protocol processing 606 determines whether the connection is marked lockless 627. If the connection is marked lockless 627, protocol processing 606 queues the data to the application without cross-core data sharing or locks 628 and indicates to the application that data is available. The application 602 then proceeds to retrieve the data without cross-core data sharing or locks. If the connection is not marked lockless 627, protocol processing 606 queues the data which is shared across cores 629 and indicates to the application that data is available. The server application 602 then proceeds to retrieve and process the data, which can involve cross-core sharing and locks.

Figure 7:
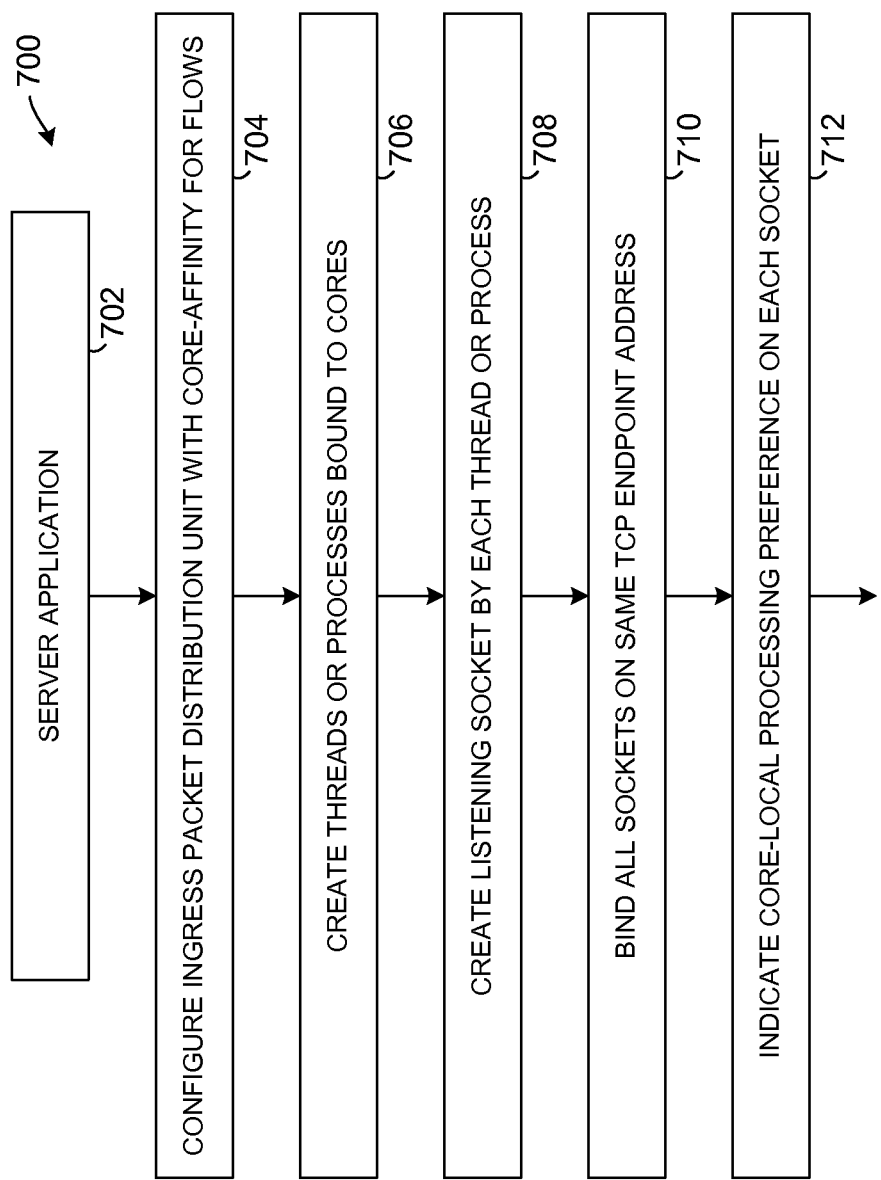
FIG. 7 is a schematic flow chart that depicts a technique for initialization of core-affine TCP processing for SMP processing.

Referring to FIG. 7, a schematic flow chart depicts a technique for initialization of core-affine TCP processing for SMP processing. An embodiment of an initialization method 700 can be executed in a server application 702. An ingress packet distribution unit can be configured 704 with core affinity for flows. Tasks are created 706 and bound to the cores. A listening socket can be created 708 by each task or process. All sockets can be bound 710 on the same TCP endpoint address. A core-local processing preference can be indicated 712 on each socket.

Embodiments and/or applications of the illustrative method can improve throughput and efficiency to varying degrees. For example, analysis of TCP stack processing on a Linux implementation suggests a performance benefit of 10% to 20% in throughput for a TCP connection through avoidance of locks and synchronization. More or less improvement can occur for various implementations and applications.

Embodiments of electronic circuits, systems, executable logic, and associated operating methods can use any socket type that handles information flows, and is not exclusive to TCP. For example, User Datagram Protocol (UDP) sockets can also be processed in a similar manner, enabling a UDP stream to be processed on one core.

The disclosed systems, methods, and components can also be used in various systems for core-affine processing, SMP, TCP core affinity, TCP session affinity, UDP affinity, network support in multicore processing systems for networking and communication equipment, Internet protocol (IP) stacks, and the like.

When load distribution is adequately balanced across the cores, TCP connection rates and TCP throughput can be improved as locking and cache contention are avoided or minimized.

The disclosed embodiments of electronic circuits, systems, executable logic, and associated operating methods, by enabling core-affine TCP processing throughout the information pathway to the application, inter-core communications and synchronization requirements are avoided when processing TCP connections on SMP systems. The technique also enables freedom from effects to legacy applications that are not specifically configured to handle such core-affine processing.

Terms "substantially", "essentially", or "approximately", that may be used herein, relate to an industry-accepted variability to the corresponding term. Such an industry-accepted variability ranges from less than one percent to twenty percent and corresponds to, but is not limited to, components, systems, structures, topology, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims.

The illustrative pictorial diagrams depict structures and process actions in a communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

An embodiment of a symmetric multi-processing (SMP) system includes a server application configured to create a plurality of tasks and bind the plurality of tasks to a plurality of core processors, the plurality of tasks configured to create a corresponding listening endpoint socket, and bind and listen on a protocol address common to the plurality of tasks. According to a further embodiment, the SMP system also can be configured such that the plurality of tasks are configured to generate an indication to a stack on the plurality of endpoint sockets respective to the plurality of tasks, the indication specifying that a listened-to endpoint socket accepts endpoint connections arriving on a same core processor. According to a further embodiment, the SMP system also can be configured such that the server application is configured so that the indication is recorded by a Transmission Control Protocol/Internet Protocol (TCP/IP) stack including marking an endpoint socket respective to a task of the plurality of tasks indicative of a local core preference, the TCP/IP stack storing core-identifier information within the endpoint socket and storing the endpoint socket in a core-local data structure specific to the respective core processor. According to a further embodiment, the SMP system further includes a protocol layer configured to respond to an ingress Transmission Control Protocol (TCP) connection on a predetermined core processor of the plurality of core processors by performing lookup of core-local information to locate a listening endpoint socket corresponding to a task local to the predetermined core processor with a core-preference for handling the TCP connection using the listening endpoint socket, such that the TCP connection, if located, being established on the located listening endpoint socket, applied to the task local and bound to the predetermined core processor without sharing data structures between cores or using locks, and marked as no-lock required, and the TCP connection, if not located, being passed to any available task of a matching socket with semantics preserved. According to a further embodiment, the SMP system also can be configured such that the located TCP connection applies subsequent packets arriving on the located TCP connection on the predetermined core processor to the task local and bound to the predetermined core processor and processed lock-free. According to a further embodiment, the SMP system further includes a protocol layer configured to respond to arrival of a plurality of packets of an incoming Transmission Control Protocol (TCP) connection on a predetermined core processor of the plurality of core processors by interrogating sockets information to locate an endpoint socket corresponding to a task local to the predetermined core processor with a core preference for handling the TCP connection using the listening endpoint socket. According to a further embodiment, the SMP system further includes a Transmission Control Protocol/Internet Protocol (TCP/IP) stack configured to interrogate sockets information to find a matching socket with an indicated local core preference and establish a connection on the predetermined core processor and pass the established connection to an application task that executes on the predetermined core processor, the established connection being marked as lockless. According to a further embodiment, the SMP system also can be configured such that the protocol layer is configured such that connection establishment and passing of the established connection to a locally-bound server process are attained without sharing data structures across core processors and without cross-core data sharing and locks. According to a further embodiment, the SMP system also can be configured such that the protocol layer is configured in absence of a task local to the predetermined core processor with an indicated core preference to select any task that is waiting for the TCP connection by locating a matching endpoint socket on another core processor or an endpoint socket that does not have core-preference indicated on the endpoint socket. According to a further embodiment, the SMP system further includes a classifier configured to send initial and subsequent incoming packets for the TCP/IP connection to the predetermined core processor such that a task on the predetermined core processor holds the TCP/IP connection and the subsequent packets are processed on the predetermined core processor without cross-core communications, the TCP/IP connection identified for lockless processing by a protocol stack by marking of a lockless attribute. According to a further embodiment, the SMP system further includes a protocol layer configured to process egress packets passing from a server to a client and ingress packets passing from the client to the server without cross-core data sharing and locks such that egress packets originating from the server are bound to a predetermined core processor of the plurality of core processors at which ingress packets of a Transmission Control Protocol (TCP) connection also arrive, and the ingress packets and the egress packets are processed on the same predetermined core processor. According to a further embodiment, the SMP system also can be configured such that the protocol layer uses a lockless attribute marked on the TCP connection to specify that locks are not required when processing the TCP connection.

An embodiment of a symmetric multi-processing (SMP) system includes a protocol layer configured to respond to arrival of a plurality of packets of an incoming Transmission Control Protocol (TCP) connection on a predetermined core processor of a plurality of core processors by interrogating sockets information to locate an endpoint socket corresponding to a task local to the predetermined core processor. According to a further embodiment, the SMP system further includes a Transmission Control Protocol/Internet Protocol (TCP/IP) stack configured to interrogate sockets information to find a matching socket with an indicated local core preference and establish a connection on the predetermined core processor and pass the established connection to an application task that executes on the predetermined core processor, the established connection being marked as lockless. According to a further embodiment, the SMP system also can be configured such that the protocol layer is configured such that connection establishment and passing of the established connection to a locally-bound server process are attained without sharing data structures across core processors and without cross-core data sharing and locks. According to a further embodiment, the SMP system also can be configured such that the protocol layer is configured in absence of a task local to the predetermined core processor with an indicated core preference to select any task that is waiting for the TCP connection by locating a matching endpoint socket on another core processor or an endpoint socket that does not have core-preference indicated on the endpoint socket. According to a further embodiment, the SMP system further includes a classifier configured to send initial and subsequent incoming packets for the TCP/IP connection to the predetermined core processor such that a task on the predetermined core processor holds the TCP/IP connection and the subsequent packets are processed on the predetermined core processor without cross-core communications, the TCP/IP connection identified for lockless processing by a protocol stack by marking of a lockless attribute.

An embodiment of a method for symmetric multi-processing (SMP) system includes creating a plurality of tasks, binding the plurality of tasks to a plurality of core processors, creating a listening endpoint socket corresponding to the plurality of tasks, and binding and listening on a protocol address common to the plurality of tasks. According to a further embodiment, the method for SMP system further includes responding to an ingress Transmission Control Protocol (TCP) connection on a predetermined core processor of the plurality of core processors including performing look-up of core-local information to locate a listening endpoint socket corresponding to a task local to the predetermined core processor with a core-preference for handling the TCP connection using the listening endpoint socket, if the listening endpoint is located, establishing the TCP connection on the located listening endpoint socket, applying the TCP connection to the task local and bound to the predetermined core processor, and marking the TCP connection as no-lock required, and if the listening endpoint is not located, passing the TCP connection to any available task of a matching socket with semantics preserved. According to a further embodiment, the method for SMP system further includes responding to arrival of a plurality of packets of an incoming Transmission Control Protocol (TCP) connection on a predetermined core processor of the plurality of core processors including interrogating sockets information to locate an endpoint socket corresponding to a task local to the predetermined core processor with an indicated core preference.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:

1. A symmetric multi-processing (SMP) system comprising:
   a server application configured to create a plurality of tasks and bind the plurality of tasks to a plurality of core processors, the plurality of tasks configured to create a corresponding listening endpoint socket, and bind and listen on a protocol address common to the plurality of tasks; and
   a protocol processor configured to respond to an ingress Transmission Control Protocol (TCP) connection on a predetermined core processor of the plurality of core processors by performing look-up of core-local information to locate a listening endpoint socket corresponding to a task local to the predetermined core processor with a core-preference for handling the TCP connection using the listening endpoint socket,
      when the listening endpoint is located, establishing the TCP connection on the located listening endpoint socket, applying the TCP connection to the task local and bound to the predetermined core processor, and marking the TCP connection as no-lock required, and
      when the listening endpoint is not located, passing the TCP connection to any available task of a matching socket with semantics preserved.

2. The SMP system according to claim 1 wherein:
   the plurality of tasks are configured to generate an indication to a stack on the plurality of endpoint sockets respective to the plurality of tasks, the indication specifying that a listened-to endpoint socket accepts endpoint connections arriving on a same core processor.

3. The SMP system according to claim 2 wherein:
   the server application is configured wherein the indication is recorded by a Transmission Control Protocol/Internet Protocol (TCP/IP) stack comprising marking an endpoint socket respective to a task of the plurality of tasks indicative of a local core preference, the TCP/IP stack storing core-identifier information within the endpoint socket and storing the endpoint socket in a core-local data structure specific to the respective core processor.

4. The SMP system according to claim 1 wherein:
   the located TCP connection applies subsequent packets arriving on the located TCP connection on the predetermined core processor to the task local and bound to the predetermined core processor and processed lock-free.

5. The SMP system according to claim 1, wherein:
   the protocol processor is further configured to respond to arrival of a plurality of packets of an incoming Transmission Control Protocol (TCP) connection on a predetermined core processor of the plurality of core processors by interrogating sockets information to locate an endpoint socket corresponding to a task local to the predetermined core processor with a core preference for handling the TCP connection using the listening endpoint socket.

6. The SMP system according to claim 5 further comprising:
a Transmission Control Protocol/Internet Protocol (TCP/IP) stack configured to interrogate sockets information to find a matching socket with an indicated local core preference and establish a connection on the predetermined core processor and pass the established connection to an application task that executes on the predetermined core processor, the established connection being marked as lockless.

7. The SMP system according to claim 5 wherein:
the protocol processor is configured wherein connection establishment and passing of the established connection to a locally-bound server process are attained without sharing data structures across core processors and without cross-core data sharing and locks.

8. The SMP system according to claim 5 wherein:
the protocol processor is configured in absence of a task local to the predetermined core processor with an indicated core preference to select any task that is waiting for the TCP connection by locating a matching endpoint socket on another core processor or an endpoint socket that does not have the core-preference indicated on the endpoint socket.

9. The SMP system according to claim 5 further comprising:
a classifier configured to send initial and subsequent incoming packets for the TCP/IP connection to the predetermined core processor wherein a task on the predetermined core processor holds the TCP/IP connection and the subsequent packets are processed on the predetermined core processor without cross-core communications, the TCP/IP connection identified for lockless processing by a protocol stack by marking of a lockless attribute.

10. The SMP system according to claim 1 wherein:
the protocol processor is further configured to process egress packets passing from a server to a client and ingress packets passing from the client to the server without cross-core data sharing and locks wherein egress packets originating from the server are bound to a predetermined core processor of the plurality of core processors at which ingress packets of a Transmission Control Protocol (TCP) connection also arrive, and the ingress packets and the egress packets are processed on the same predetermined core processor.

11. The SMP system according to claim 10 wherein:
the protocol processor uses a lockless attribute marked on the TCP connection to specify that locks are not required when processing the TCP connection.

12. A symmetric multi-processing (SMP) system comprising:
a protocol processor configured to
respond to an ingress Transmission Control Protocol (TCP) connection on a predetermined core processor of a plurality of core processors by
performing look-up of core-local information to locate a listening endpoint socket corresponding to a task local to the predetermined core processor with a core-preference for handling the TCP connection using the listening endpoint socket,
when the listening endpoint is located, establishing the TCP connection on the located listening endpoint socket, applying the TCP connection to the task local and bound to the predetermined core processor, and marking the TCP connection as no-lock required, and
when the listening endpoint is not located, passing the TCP connection to any available task of a matching socket with semantics preserved; and
respond to arrival of a plurality of packets of the TCP connection on the predetermined core processor by interrogating sockets information to locate an endpoint socket corresponding to the task local to the predetermined core processor.

13. The SMP system according to claim 12 further comprising:
a Transmission Control Protocol/Internet Protocol (TCP/IP) stack configured to interrogate sockets information to find a matching socket with an indicated local core preference and establish a connection on the predetermined core processor and pass the established connection to an application task that executes on the predetermined core processor, the established connection being marked as lockless.

14. The SMP system according to claim 12 wherein:
the protocol processor is configured wherein connection establishment and passing of the established connection to a locally-bound server process are attained without sharing data structures across core processors and without cross-core data sharing and locks.

15. The SMP system according to claim 12 wherein:
the protocol processor is configured in absence of a task local to the predetermined core processor with an indicated core preference to select any task that is waiting for the TCP connection by locating a matching endpoint socket on another core processor or an endpoint socket that does not have core-preference indicated on the endpoint socket.

16. The SMP system according to claim 12 further comprising:
a classifier configured to send initial and subsequent incoming packets for the TCP/IP connection to the predetermined core processor wherein a task on the predetermined core processor holds the TCP/IP connection and the subsequent packets are processed on the predetermined core processor without cross-core communications, the TCP/IP connection identified for lockless processing by a protocol stack by marking of a lockless attribute.

17. A method for symmetric multi-processing (SMP) comprising:
creating a plurality of tasks;
binding the plurality of tasks to a plurality of core processors;
creating a listening endpoint socket corresponding to the plurality of tasks;
binding and listening on a protocol address common to the plurality of tasks; and
responding to an ingress Transmission Control Protocol (TCP) connection on a predetermined core processor of the plurality of core processors by
performing look-up of core-local information to locate a listening endpoint socket corresponding to a task local to the predetermined core processor with a core-preference for handling the TCP connection using the listening endpoint socket,
if the listening endpoint is located, establishing the TCP connection on the located listening endpoint socket, applying the TCP connection to the task local and bound to the predetermined core processor, and marking the TCP connection as no-lock required, and if the listening endpoint is not located, passing the TCP connection to any available task of a matching socket with semantics preserved.

18. The method according to claim 17 further comprising:
responding to arrival of a plurality of packets of the TCP connection on the predetermined core processor of the plurality of core processors by interrogating sockets information to locate an endpoint socket corresponding to the task local to the predetermined core processor with an indicated core preference.

* * * * *